United States Patent [19]

Bergquist

[11] Patent Number: 4,645,022
[45] Date of Patent: Feb. 24, 1987

[54] TRACKED LOAD CARRYING VEHICLE

[75] Inventor: Eric A. Bergquist, Sandviken, Sweden

[73] Assignee: Elektro Mekan I Arjang AB, Arjang, Sweden

[21] Appl. No.: 740,916

[22] PCT Filed: Sep. 12, 1984

[86] PCT No.: PCT/SE84/00296
§ 371 Date: Jul. 11, 1985
§ 102(e) Date: Jul. 11, 1985

[87] PCT Pub. No.: WO85/01275
PCT Pub. Date: Mar. 28, 1985

[30] Foreign Application Priority Data

Sep. 14, 1983 [SE] Sweden ............................ 8304950

[51] Int. Cl.⁴ ............................................. B62D 51/04
[52] U.S. Cl. ....................................... 180/6.7; 180/9.22; 180/19.3
[58] Field of Search ................. 180/9.22, 19.1, 19.3, 180/6.2, 6.7

[56] References Cited

U.S. PATENT DOCUMENTS

| | | | |
|---|---|---|---|
| 2,572,109 | 10/1951 | Coates | 180/19.1 |
| 2,614,642 | 10/1952 | Dumais | 180/9.62 |
| 2,713,917 | 7/1955 | Soenksen | 180/19.3 X |
| 3,055,445 | 9/1962 | Mendez et al. | 180/6.7 |
| 3,216,520 | 11/1965 | Blonsky | 180/9.25 |
| 3,444,945 | 5/1969 | Coordes et al. | 180/19.3 |
| 3,635,301 | 1/1972 | Tuson | 180/19.2 |
| 3,812,929 | 5/1974 | Farque | 180/167 |
| 4,135,592 | 1/1979 | Wincent | 180/19.3 X |

FOREIGN PATENT DOCUMENTS

| | | |
|---|---|---|
| 958719 | 2/1957 | Fed. Rep. of Germany . |
| 340110 | 3/1936 | Italy ...................... 180/9.22 |
| 82029554 | 11/1983 | Sweden . |
| 407960 | 3/1934 | United Kingdom . |

Primary Examiner—John A. Pekar
Attorney, Agent, or Firm—Spencer & Frank

[57] ABSTRACT

A tracked load carrying vehicle comprises a chassis (10); an engine (11) mounted on the chassis for propelling the vehicle; an output shaft (13) driven by the engine; two tracks (14,15) provided in parallel on either side of the chassis and each one running over a plurality of wheels (16–19,20–23), at least one of which being adapted to be driven by the output shaft (13) of the engine for driving the track; and a control lever (60) for steering the vehicle. A clutch is connected between the output shaft (13) of the engine and each one of the tracks (14,15), so that either one of the tracks can be disengaged. The control lever (60) is adapted to actuate one or the other of the clutches by means of a linkage, so that the clutch interrupts the transmission to the pertaining track (14,15). These features will give the vehicle a small turning radius and good maneuverability. The vehicle can also be provided with braking means for braking the tracks.

9 Claims, 4 Drawing Figures

TRACKED LOAD CARRYING VEHICLE

BACKGROUND OF THE INVENTION

The present invention relates to a tracked load carrying vehicle comprising a chassis; an engine mounted on the chassis for propelling the vehicle; an output shaft driven by the engine; two parallel tracks provided on either side of the chassis, with each track running over a plurality of wheels, and with at least one wheel associated with each track being adapted to be driven by the output shaft of the engine for driving the track; and a control lever for steering the vehicle. The load carrying vehicle is primarily intended as an aid for transporting heavy objects in woods and fields, all the year round. For example, such vehicles may be used for pulling logs in the woods, for the transportation of plants in connection with new plantation in clearings, and for the transportation of carcases in connection with hunting.

Load carrying vehicles for the above mentioned purposes are previously known. These vehicles are either of the snow-scooter-type having tracks at the rear and turnable runners or wheels in front, or tracked special vehicles having particular equipment, for example a hoist. These prior art vehicles have the disadvantage in common that they are difficult to handle in wood-land where the free space available is limited, because of their limited steering capacity. Moreover, vehicles steered by means of runners or wheels have a large turning radius, and prior art vehicles of other types have had a low steering capacity or no steering capacity at all, so that a change of direction must be provided by turning the vehicle, for example, by forcefull pulling on an operating arm attached to the vehicle. This later type operation is tiresome and time-consuming.

It is known to steer tracked vehicles, particularly heavy tracked vehicles and armoured cars, by disengaging and/or braking one of the tracks while continuously driving the other track, thus providing a turning of the vehicle. This steering method requires complicated mechanical steering devices which normally are controlled by a person who rides in or on the vehicle. An example on this type of steering is diclosed in U.S. Pat. No. 2,614,642.

It is also known to steer small load carrying vehicles by means of a control lever adapted to actuate a braking device for braking one or the other of two tracks or driving wheels. Such a device is disclosed in the U.S. Pat. No. 3,444,945. The steering device disclosed in this patent, however, comprises a differential, so that braking of one track entails a faster driving of the other track. If one track skids, no driving force at all is obtained from the other track. Such a device is not suitable for load carrying vehicles which must be operable under hard conditions in woods and fields all the year round.

SUMMARY OF THE INVENTION

The main object of the present invention is to provide a tracked load carrying vehicle which is easy to steer, and therefore very easy to handle even in difficult terrain, and which has a low weight and small size, so that it easily can be moved between different places.

The above object is achieved according to the present invention by a tracked load carrying vehicle comprising: a chassis; an engine mounted on the chassis for propelling the vehicle; an output shaft driven by the engine; two parallel tracks provided one on either side of the chassis, with each track running over a plurality of wheels, and with each track being adapted to be driven by the output shaft of the engine; a respective clutch disposed between the engine output shaft and each track, with the clutches being arranged so that either one of the tracks can be disengaged from the output shaft of the engine; a control lever for steering the vehicle, with the control lever being adapted to be turned around a substantially vertical shaft and being adapted to actuate one or the other of the clutches when turned from a neutral position to one side or the other side, so that the clutch interrupts the driving of the pertaining track; a cross arm provided for the control lever, with each end of the cross arm being connected to a respective linkage arrangement adapted to transmit the turning motion to the respective clutch; and each linkage arrangement consists of a link arm, one end of which is pivoted on the cross arm and the other end of which is provided with a projecting pin engaged within an aperture in one end of a pivotally mounted angle arm whose other end is adapted to engage with a movable portion of the clutch, the linkage arrangement being such that when the control lever is turned from a neutral position to either side, the respective clutch on the side to which the lever is moved is disengaged without affecting the clutch on the opposite side.

Due to the fact that the load carrying vehicle is provided with a clutch for each track and a turnable control lever by means of which the clutches can be actuated, either one of the tracks easily and rapidly can be disengaged from the engine. Therefore, the load carrying vehicle can be turned with a very small turning radius in any direction and with a rapid change between different turning directions. The use of a cross arm attached to the control lever and a simple linkage for controlling the clutches, which preferably are claw clutches, will make the construction simple and reliable. The provision of separate track brakes for steering according to a further feature of the invention will further improve the maneuverability of the vehicle.

Due to the fact that one of the tracks can be disengaged from the engine, a heavy load, for example, when pulling logs of wood, can be started by running first one track, which is then supplied with the full power from the engine, and then engaging the other track, thus creating a powerful jerk. Also comparatively heavy loads can be started with a comparatively low power engine, so that the weight as well as the manufacturing cost of the vehicle can be kept low.

The load carrying vehicle is intended to be steered by means of a control lever which is handled by a person walking in front of or beside the vehicle, and the mentioned combination of the control lever and the clutches will then provide the special advantage that an automatic correction will be obtained in case the vehicle is skidding or is pulling diagonally, for example due to icy spots or mud. In case the vehicle unintentionally is turning diagonally to the desired direction, the track causing the diagonal movement due to a more powerful propulsion of the vehicle will be disengaged, so that the full engine power can be used by the other track to return the vehicle to the desired direction. As soon as the vehicle has recovered the desired direction, the first track will again be engaged, so that both tracks again propel with the same force. Due to this automatic correction of direction, the use of the vehicle on bad and rough roads is highly facilitated, particularly in the winter and in heavy rainfall and snowfall. At the same time, the risk of diagonal pushing due to a heavy load pushing from behind on downhill slopes is considerably reduced.

BRIEF DESCRIPTION OF THE DRAWINGS

The vehicle according to the invention will now be described more in detail with reference to the attached drawings.

DETAILED DESCRIPTION OF THE PREFERRED EMBODIMENTS

Figure 1:
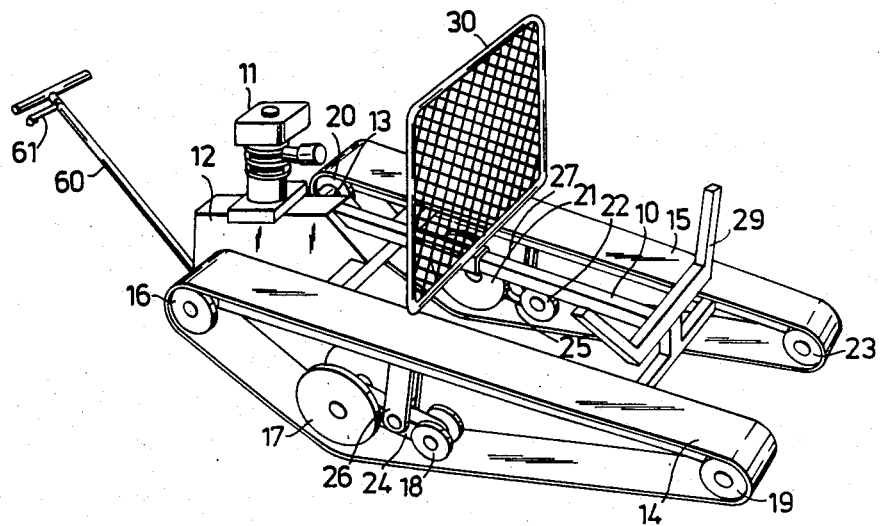
FIG. 1 is a perspective view of a tracked load carrying vehicle according to the invention.

The tracked load carrying vehicle shown in FIG. 1 comprises a chassis 10 and an engine 11, mounted on the chassis, for propelling the vehicle. The output shaft of the engine 12 is connected to a gear box 12 having a transverse output shaft 13 (FIG. 2) for transmission of the propelling power from the engine 11.

The chassis 10 is further provided with two tracks 14,15 which are positioned in parallel with each other on either side of the chassis. Each track runs over a plurality of guide wheel pairs 16–19 and 20–23, respectively, with the shafts of these wheel pairs being mounted in bearings in the chassis 10. The wheel pairs 17,18 and 21,22 are mounted in bearings at opposite ends of respective tiltable arms 24 and 25, which are pivotally mounted in bearings in respective bracket 26 and 27 projecting from the chassis. The tiltable arms 24,25 are spring loaded by means of springs (not shown), so that the tracks 14 and 15 always are stretched. The wheels of the front wheel pair 16 and 20 for each track are adapted to be driven by the output shaft 13 from the gear box 12 for driving the tracks 14,15. The wheels are provided with projecting teeth (not shown), and the tracks are provided with corresponding apertures or perforations (not shown) in a conventional manner.

In the front, the vehicle is provided with a control lever 60 whose operation will be described in detail below.

The chassis 10 is also provided with a rotatably mounted clamp 29 for use in pulling timber logs or for the attachment of a trailer, and with a vertically extending protection net 30 for protecting the engine 11.

Figure 2:
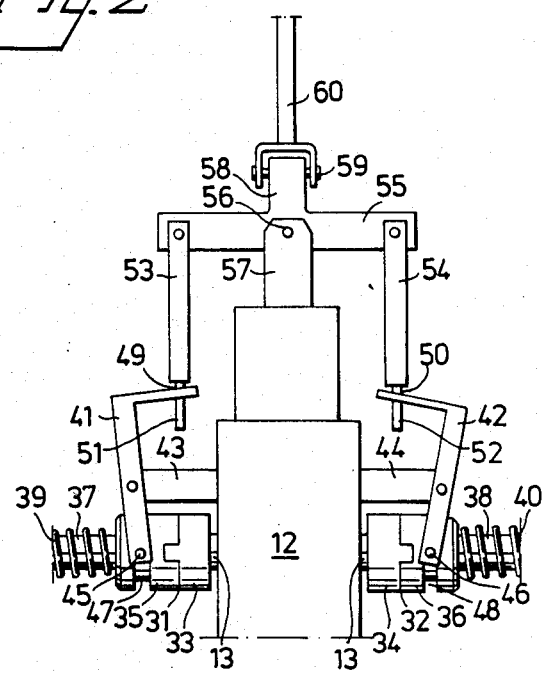
FIG. 2 is an enlarged diagramatic plan view of the steering mechanism and the clutches for the vehicle shown in FIG. 1.

The transmission from the output shaft 13 of the gear box 12 to the wheel pairs 16,20 is shown in FIG. 2. Each end of the output shaft 13 is provided with a claw clutch 31 and 32, respectively. One portion 33 and 34 of each clutch is rigidly connected to the output shaft 13 and the other portion 35 and 36 of each clutch is axially movably mounted on a respective rotatable intermediate shaft 37, 38. The intermediate shafts 37 and 38 are connected to the track driving pair of wheels 16 and 20, respectively. The axially movable portion 35 and 36 of each claw clutch is spring loaded by means of a respective spring 39 and 40, so that it meshes with the associated respective fixed portion 33, 34 on the output shaft 13 and can be brought out of mesh by means of a respective angular arm 41, 42. Each angular arm is pivotally mounted on a respective bracket 43, 44 projecting from the gear box 12. One end of each angular arm 41, 42 is forked and provided with a respective pair of pins 45, 46 with only one pin of each pair being shown in FIGS. 2 and 3, as the other pin is on the opposite side of the respective shafts 37 and 38. The respective pairs of pins 45,46 engage with grooves 47 and 48, respectively, in the respective movable portions 35,36 of the claw clutches. The other end of each angular arm 41,42 is provided with an aperture 49, 50, respectively for engagement with a respective pin 51, 52 provided at the rear end of an arm 53 and 54, respectively. The forward ends of the arms 53,54 are pivotally mounted, by means of respective bearings on the respective ends of a cross arm 55. The cross arm 55 is pivotally mounted, at its center point, on a vertical shaft 56 mounted on a bracket 57 which is rigidly attached to the gear box 12. The cross arm 55 is at its centre provided with a central forwardly projecting portion 58 carrying a horizontal pivot 59 on which the control lever 60 is mounted. The pivot 59 is intented for positioning the control lever 60, so that the lever 60 can be swivelled in a plane perpendicular to the plane of the cross arm 55.

Figure 4:
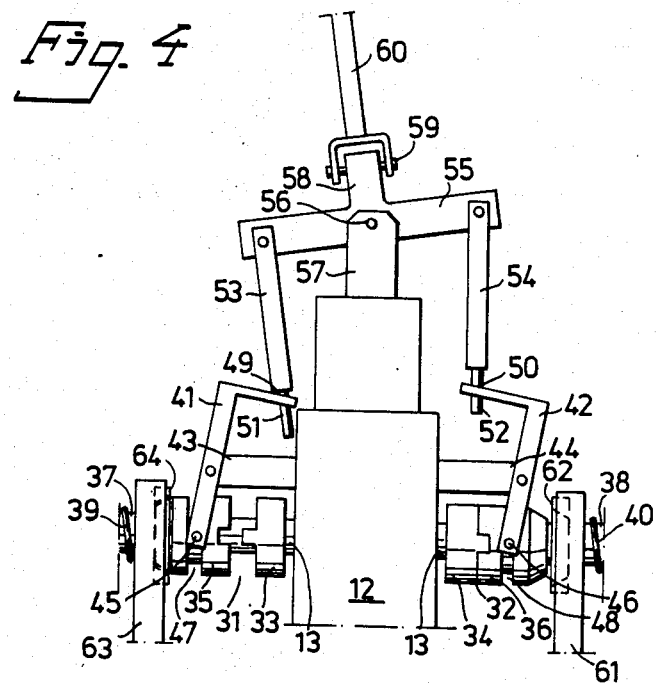
FIG. 4 shows a modified embodiment of the steering mechanism and the clutches according to FIGS. 2 and 3 including steering brakes for the tracks.

In the modified embodiment shown in FIG. 4, the chassis 10 of the vehicle is provided with two brackets 61,63 on either side of the gear box 12. Each one of these brackets 61,63 carries a respective replaceable brake cone 62, 64, mounted such that it cannot rotate in the same direction as the associated intermediate shaft 37, 38. Each of the moveable clutch portions 35, 36 has a conical shape at its outer end, i.e., the end facing away from the gear box 12, with these conical ends being adapted to engage with the fixed brake cones 62 64, respectively so that the cones can operate as steering brakes, as shown in the left portion of FIG. 4.

Figure 3:
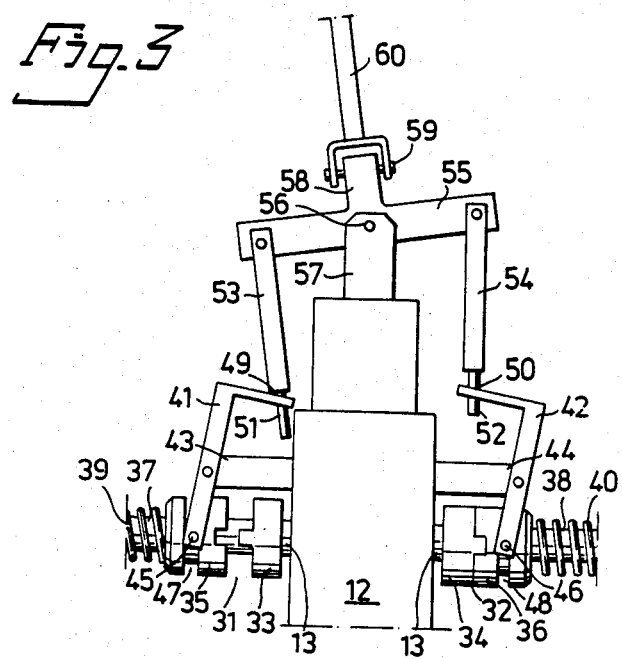
FIG. 3 is a view corresponding to that of FIG. 2, showing the steering mechanism and the clutches in a position for turning the vehicle.

The operation of the steering means will now be described with reference to FIGS. 2 and 3. When the control lever 60 is in the straight forward or neutral position shown in FIG. 2, i.e., parallel to the longitudinal central axis of the vehicle, both claw clutches 31,32 are in engagement, so that the power from the engine 11 is transmitted equally to both parallel tracks. The vehicle is then propelled straight ahead. When the vehicle has to be turned, the control lever 60 is moved in the direction of the desired turn, for example to the left, as shown in FIG. 3. This will cause the cross arm 55 to be turned, so that the arms 53 and 54 are moved. The arm 53 will then be pushed towards the angular arm 41, so that this arm is turned (clockwise in FIG. 3), thus moving the movable portion 35 of the claw clutch 31 toward the left in FIG. 3 against the force of the spring 39, so that the clutch portions 33 and 35 are disengaged. The transmission of power from the output shaft 13 to the intermediate shaft 37 and the wheel pair 16 for the track 14 is thus interrupted, so that the track 14 stops or only moves due to the movement of the vehicle. The other claw clutch 32 is not actuated by the changed direction of the control lever, as the pin 52 of the arm 54 is merely lifted a small distance in the aperture 50 of the angular arm 42. Thus, the propelling of the other track 15 is continued and this track can then use the full power from the engine. The vehicle will then turn around its vertical central axis with a very small turning radius.

The vehicle can be turned to the right by moving the control lever to the right in a corresponding way.

In the case when the vehicle is provided with separate steering brakes 35,64,63 and 36,62,61, respectively, according to FIG. 4, the transmission of power to the track will be interrupted and the track will also be braked, when the control lever 60 is turned to its end position, i.e. when the movable portion 35 or 36 of the claw clutch is in engagement with the brake cone 64 or 62, respectively. The brake cones are, by means of the brackets 63 and 61, rigidly attached to the chassis 10 of the vehicle.

The control lever 60 is pivoting around the shaft 56, which is substantially vertical in normal use of the vehicle, so that a change of turning direction can be made rapidly, as well as around the substantially horizontal pivot 59, so that the control lever 60 can be kept at a comfortable level for work. The control lever 60 may be provided with a control for adjusting the rotation speed of the engine.

Due to the design of the steering means with two clutches for interrupting the transmission to one or the other of the tracks, a comparatively low power engine can be used, for example a gasoline engine of about 5 Hp. The engine 11 is preferably provided with a centrifugal clutch, so that the shaft of the engine is connected to the gear box 12 when the rotational speed of the engine exceeds a certain limit. This may be achieved by appropriately controlling the supply of gasoline to the engine by means of the throttle control 61 attached to the control lever 60. This will avoid a separate clutch control.

While only two embodiments of the tracked load carrying vehicle according to the invention have been described and shown, it is evident that many modifications and variations are possible within the scope of the invention. For example, instead of claw clutches, friction clutches can be used, and instead of the illustrated wheel pairs, driving rolls can be used. As an alternative, the wheels can be provided in a bogie, and the bogie can then be attached to the chassis or form the chassis. The control lever can also be arranged so that the vehicle can be steered from beside the vehicle, which may be an advantage, for example, when heavy loads have to be transported down steep hills. The steering brakes can alternatively be designed for direct, firm locking, for example by means of teeth or jaws.

I claim:

1. A tracked load carrying vehicle comprising: a chassis; an engine mounted on said chassis for propelling the vehicle; an output shaft driven by said engine; two parallel tracks provided one on either side of said chassis, with each said track running over a respective plurality of wheels; means for driving said tracks including respective clutches connected between said output shaft of said engine and at least one of said wheels associated with each of said tracks with said clutches being arranged so that either one of said tracks can be disengaged from said output shaft; a control lever for steering the vehicle; a cross arm connected to said control lever; means for mounting said control lever and said cross arm on said chassis such that they can be turned together about a substantially vertical shaft; and first and second linkage means, each connected between said cross arm and a respective one of said clutches and each responsive to the turning of said control lever from a neutral position toward a respective side of the vehicle, for activating the one of said clutches on the side to which said lever is turned to interrupt the driving of the associated said track by said drive shaft without affecting the clutch of the other side of the vehicle, each of said linkage means including a link arm having one of its ends pivotally mounted on a respective end of said crossbar and its other end provided with a projecting pin, and a pivotally mounted angular arm having an aperture at one end which is engaged by said projecting pin of said link arm and means at the other end of said angle arm for engaging the moveable portion of the associated one of said clutches.

2. A vehicle according to claim 1 wherein said angular arms are pivotally mounted on brackets which are rigidly attached to said chassis.

3. A vehicle according to claim 1 wherein said cross arm of said control lever is pivotally mounted on said substantially vertical shaft which forms the vertical pivot for said control lever and which is rigidly secured to said chassis, and said control lever pivotally mounted on a horizontal shaft disposed on said cross arm.

4. A vehicle according to claim 1 wherein said clutches are claw clutches, with one portion of each said claw clutch being rigidly attached to said output shaft of said engine and with the other portion of each said clutch being movable on a respective intermediate shaft provided to transmit the power from said output shaft of the engine to the respective said track.

5. A vehicle according to claim 4 wherein said moveable portion of each of said clutches is adapted to cooperate with a respective brake means rigidly attached to said chassis for braking the respective said track.

6. A vehicle according to claim 5 wherein said movable portion of each said clutch is provided with a conical end, and each said brake means includes a respective brake cone attached to said chassis of the vehicle and adapted to cooperate with said conical end of the respective said movable portion for braking the respective said track when said control lever is positioned in one or the other of its end positions.

7. A vehicle according to claim 1 wherein said chassis is provided with a rotatably mounted clamp provided for the transportation of timber logs or for attaching a trailer to said chassis.

8. A vehicle according to claim 1 wherein said movable portion of each of said clutches is adapted to cooperate with a respective brake means rigidly attached to said chassis for braking the respective said track.

9. A vehicle according to claim 8 wherein said movable portion of each said clutch is provided with a conical end, and each said brake means includes a respective brake cone attached to said chassis of the vehicle and adapted to cooperate with said conical end of the respective said movable portion for braking the respective said track when said control lever is positioned in one or the other of its end positions.

* * * * *